INVENTOR.
HENRI-GEORGES DOLL
BY
his ATTORNEYS

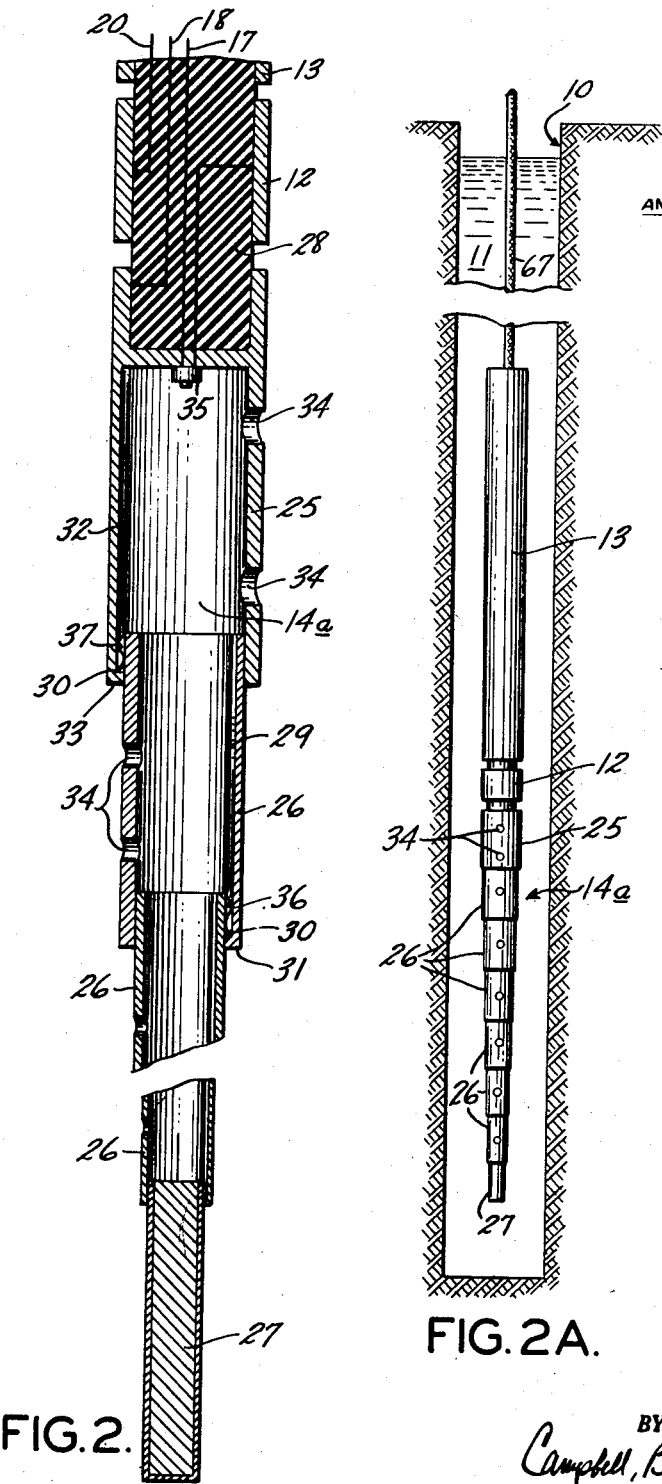
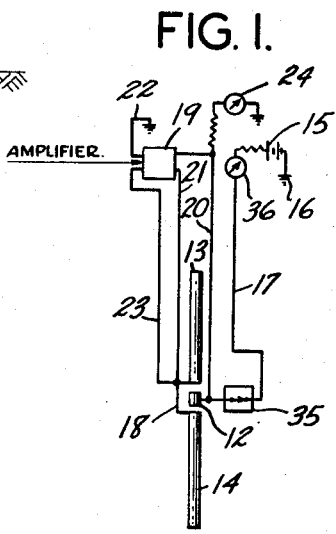
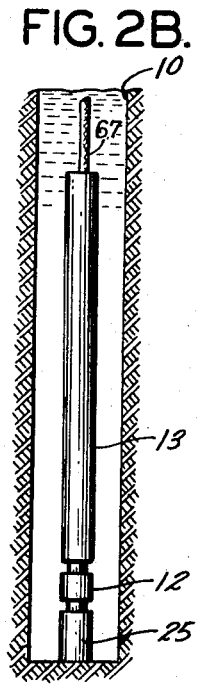
FIG. 1.
FIG. 2.
FIG. 2A.
FIG. 2B.
INVENTOR.
HENRI-GEORGES DOLL
BY
his ATTORNEYS March 15, 1955 HENRI-GEORGES DOLL 2,704,347
ELECTRODES FOR ELECTRICAL WELL LOGGING
Filed Dec. 6, 1951 3 Sheets-Sheet 2

March 15, 1955 HENRI-GEORGES DOLL 2,704,347
ELECTRODES FOR ELECTRICAL WELL LOGGING
Filed Dec. 6, 1951 3 Sheets-Sheet 3

INVENTOR.
HENRI-GEORGES DOLL
BY
his ATTORNEYS

United States Patent Office 2,704,347
Patented Mar. 15, 1955

2,704,347

ELECTRODES FOR ELECTRICAL WELL LOGGING

Henri-Georges Doll, Ridgefield, Conn., assignor to Schlumberger Well Surveying Corporation, Houston, Tex., a corporation of Delaware Application December 6, 1951, Serial No. 260,211

10 Claims. (Cl. 324—10)

The present invention relates to electrical logging apparatus and more particularly to new and improved electrode means for use in electrical logging operations in wells and the like.

In the current oil and gas production practice, it is highly desirable to be able to make electrical logs of the formations very close to the bottom of the bore hole. However, this is difficult of accomplishment with certain of the electrical logging systems now in use. For example, the applicant's copending application Serial No. 211,788, filed February 19, 1951, for "Electrical Logging Apparatus," discloses a system utilizing an electrode array comprising a relatively short, principal current emitting electrode disposed between a pair of longitudinally spaced apart elongated electrodes.

In order to insure that the current from the principal current emitting electrode will flow to the formation located a great lateral distance from the wall of the bore hole, as required to obtain indications of electrical resistivity that are more nearly representative of the true formation resistivities, the two elongated electrodes should be made extremely long. When this is done, however, the principal current electrode is still a considerable distance from the bottom of the bore hole when the lower elongated electrode reaches the bottom. Since in an electrode array of this type the electrical resistivity determinations are obtained from measurements of the potential associated with the current flow from the principal current electrode, formations closer to the bottom of the bore hole than a distance equal to the length of the lower elongated electrode cannot be logged. This distance can, of course, be shortened by making the elongated electrodes shorter than desired, provided that some loss in accuracy can be tolerated.

Further, if two or more electrical resistivity logs representing different lateral depths of investigation in a well are desired, separate runs have to be made in the well with electrode arrays having elongated electrodes of different lengths, respectively. Obviously, such procedure is time consuming and expensive.

It is an object of the invention, accordingly, to provide new and improved electrical logging apparatus embodying elongated electrodes which is capable of producing electrical logs of satisfactory accuracy substantially to the bottom of a well containing a column of conducting liquid.

Another object of the invention is to provide new and improved electrical logging apparatus of the above character having electrode means of adjustable length.

A further object of the invention is to provide new and improved electrical logging apparatus which is adapted to provide electrical resistivity determinations representing two or more lateral depths of investigation in a well.

According to the invention, these and other objects are attained by providing electrode arrays including at least one elongated electrode of adjustable length. In one embodiment, the lower elongated electrode in an electrode array is constructed so that its length will reduce progressively as lowering of the array is continued after it has reached the bottom of the bore hole, to enable a principal current electrode to be lowered substantially to the bottom.

In accordance with another embodiment, provisions are made for adjustment of both the upper and lower elongated electrodes as required to enable logs representing different lateral depths of investigation to be obtained.

The invention may be better understood from the following detailed description of several representative embodiments thereof, taken in conjunction with the accompanying drawings in which:

Fig. 1 is a schematic diagram of a typical electrical logging system in which the electrode apparatus of the present invention may be effectively utilized;

Fig. 2 is a view in longitudinal section of a representative form of electrode construction according to the invention;

Figs. 2A and 2B illustrate electrode apparatus of the type shown in Fig. 2 in a bore hole in the extended and collapsed positions, respectively;

Figure 3:
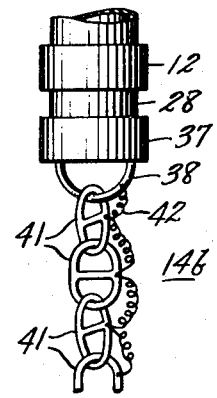
Fig. 3 is a partial view in elevation of another form of electrode, in accordance with the invention.

Fig. 1 shows an electrical logging system of the type disclosed in the aforementioned copending application Serial No. 211,788. It comprises a pair of longitudinally spaced apart elongated electrodes 13 and 14 between which is disposed a relatively short principal current emitting electrode 12. Current is fed to the principal current electrode 12 through a conductor 17 which is connected at the surface of the earth to one terminal of a constant current source 15, the other terminal of which is grounded at 16. The elongated electrodes 13 and 14 are connected together by means of an insulated conductor 18 and the potential difference between these electrodes and the principal current electrode 12 is supplied through the conductors 20 and 21 to the input terminals of a high gain amplifier 19. One output terminal of the amplifier 19 is connected to ground at 22, and the other output terminal is connected by a conductor 23 to the electrodes 13 and 14. The principal current electrode 12 is also connected by a conductor 20 to one terminal of an indicating instrument which is preferably a high impedance recording galvanometer 24, the other terminal of which is grounded, as shown.

As more fully explained in the aforementioned copending application, the potential indications given by the galvanometer 24 in the electrical logging system shown in Fig. 1 will be more nearly indicative of the true electrical resistivities of the formations traversed by the bore hole opposite the principal current emitting electrode 12.

In order to obtain true determinations of electrical resistivity, in actual field practice, the electrodes 13 and 14 may be made anywhere from 4 to 10 feet or more in length. It will be apparent, therefore, that when the lower elongated electrode 14 in Fig. 1 reaches the bottom of the bore hole, the principal current emitting electrode will still be a considerable distance away from the bottom. Hence, it has not been possible heretofore to log the formations surrounding the lower electrode 14 when it rests at the bottom of a well.

In accordance with the invention, the log obtained may be extended substantially to the bottom of the well by utilizing a collapsible electrode 14a of the type shown in Fig. 2 in place of the fixed electrode 14 of Fig. 1. The electrode 14a may comprise an upper segment 25, a lower segment 27 and a plurality of intermediate segments 26, the segments 26 and 27 being adapted to telescope progressively into the segment 25 as lowering of the electrode array continues after the segment 27 has reached the bottom of the well.

The construction of the telescoping electrode 14a is such that it remains fully extended during normal passage of the electrode array through the bore hole, collapses when lowering of the electrode array is continued after the lowest segment 27 reaches the bottom of the well, and again extends itself as the electrode array is raised from the bottom. The upper elongated electrode 13 and the principal current emitting electrode 12 may be in the form of annular blocks of conductive metal securely fastened in any suitable manner to a cylindrical housing 28 made of sturdy, nonconductive material such as rubber, for example. The segments 25, 26 and 27, of which there may be any desired number greater than one, are preferably manufactured from strong, conductive material such as steel, for example.

The upper cylindrical segment 25 may be attached to the nonconductive support 28, in any convenient manner. The intermediate segments 26 should have progressively smaller diameters and should be constructed so as to fit snugly within each other and within the segment 25. The lowermost segment 27 may serve as a weight and to this end it may comprise a hollow steel cylinder filled with a weighting material, such as lead, for example. Suitable means is provided to prevent the segments from becoming separated from one another when the electrode 14a is in the fully extended position. Such means may comprise, for example, a projection 30 formed on each of the segments 26 which is adapted to slide within a groove 29 formed in the segment 26 above. The wall 31 at the lower end of the groove 29 forms a stop which retains the lower segment 26 securely to the next upper segment 26 when the electrode array is in the position of fullest extension shown in Fig. 2.

The upper segment 25 is also provided with a longitudinally extending groove 32 in which the projection 30 on the topmost segment 26 is adapted to be received. The lower wall 33 beneath the groove 32 serves as a stop to prevent the two segments from becoming separated when in the fully extended position. Similar means are provided for preventing the lower segment 27 from becoming separated from the lowermost segment 26. Also, the segments 25 and 26 preferably are provided with a plurality of ports 34 in order to insure that the pressure inside the electrode 14a will be the same as the pressure of the fluid contained in the bore hole.

In order to insure good electrical contact continuously between the electrode segments 25, 26 and 27, suitable means such as the feeler arms 36 and 37 may be provided. These are adapted to press continuously against the surfaces of the grooves 29 and 32 which are preferably polished and highly conductive. In this way, all of the segments comprising the electrode 14a will be maintained at substantially the same electrical potential.

An electrode of the type shown in Fig. 2 forms part of the electrode array shown in Fig. 2A which is disposed near the bottom of a bore hole 10 containing a column of conducting liquid 11. The electrode array is adapted to be moved through the bore hole by means of an electrical cable 67 which may be controlled from the surface of the earth in the usual manner. As shown in Fig. 2A, as the electrode array is passed through the open hole, the weight of the solid block of material comprising the lower segment 27 maintains the lower elongated electrode 14a fully extended.

However, when the segment 27 reaches the bottom of the bore hole and lowering of the electrode array continues, the electrode segment 27 will telescope into the lowermost segment 26 which will in turn telescope into the next segment 26 until finally all of the segments are telescoped within the upper segment 25. This is the condition shown in Fig. 2B. As the array is then raised off the bottom of the bore hole, the weighting segment 27 will tend to remain on the bottom until the electrode 14a is again fully extended.

It may be desirable, in certain instances, for the operator at the surface to be apprised of the fact that the electrode array is resting on the bottom and that the lowermost electrode is fully collapsed. This may be acomplished in any suitable manner, as for example, by interposing in series with the conductor 17 in Fig. 1 a normally closed switch 35 which is adapted to be opened when the lower segment 27 and all of the other segments are fully collapsed within the upper segment 25. The switch 35 may be mounted in an upper wall of the upper segment 25, as shown in Fig. 2, so that it will be actuated by the lower segment 27 when the electrode 14a is in the wholly collapsed position shown in Fig. 2B. An ammeter 36 connected in series with the conductor 17 and located at the surface of the earth will read zero when the switch 35 is open and will read some other value when the switch 35 is closed, thus enabling the operator to determine readily the condition of the collapsible electrode 14a.

Figure 3B:
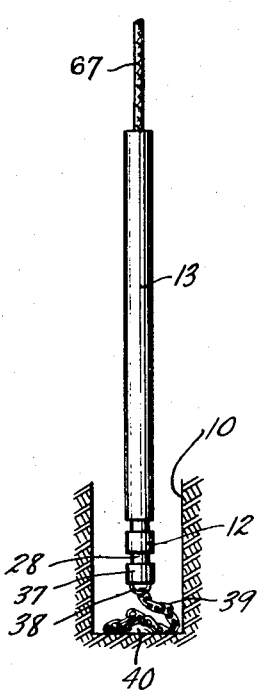
Figs. 3A and 3B show the electrode of Fig. 3 in a bore hole in the extended and collapsed positions, respectively.
Figure 3A:
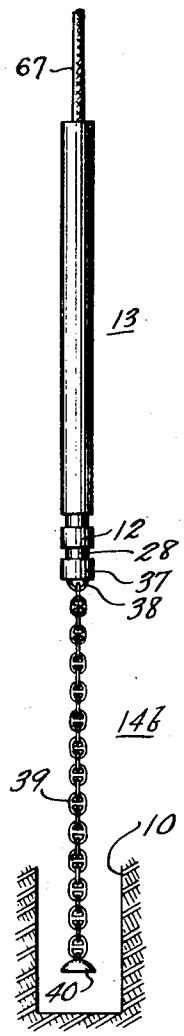

In the embodiment shown in Figs. 3, 3A and 3B, a lower elongated electrode 14b is used which comprises a chain made of strong conducting material such as steel, for example. As shown in Fig. 3, the upper end of the chain electrode 14b is secured to the nonconductive housing 28 by means of a conductive chain support 37 which carries a first link 38. Preferably, the individual links comprising the chain electrode 14b should be constructed in the well known manner shown so as to prevent knotting. Further, in order to insure good electrical contact between the adjacent links forming the chain, flexible electrical conductors 42 may be connected between adjacent links 41. Also, if desired, a heavy weight 40 may be attached to the bottom of the chain electrode 14b to facilitate its passage through a bore hole.

An electrode array including a chain electrode 14b of the type shown in Fig. 3 is shown in Fig. 3A with the chain electrode 14b in the fully extended position. As lowering of the electrode array continues after the weight 40 has reached the bottom of the bore hole 10, the chain electrode 14b will pile up on the bottom of the bore hole 10 until the principal current emitting electrode 12 substantially reaches the bottom.

Figure 4:
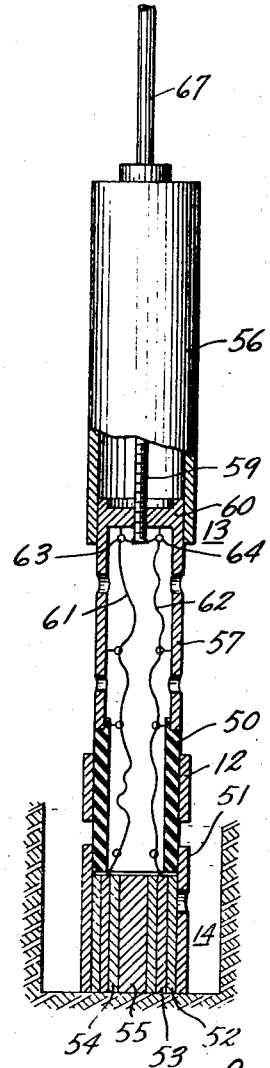
Fig. 4 is a view in longitudinal section of a further embodiment which is adapted to provide electrical logs corresponding to different lateral depths of investigation.

Fig. 4 illustrates another embodiment of the invention in which the lengths of both upper and lower elongated electrodes 13' and 14' may be adjusted while the lower elongated electrode 14' may collapse at the bottom of the bore hole in substantially the same manner as in the embodiment of Fig. 1. Referring to the figure, the upper elongated electrode 13' may be divided into two telescoping segments viz., an upper segment 56 and a lower segment 57 attached securely in any suitable manner to an insulating member 50. The upper segment 56 is adapted to be telescoped over the lower segment 57 by means of a suitable reversible electrical motor 58 securely fastened in the upper portion of the segment 56 and carrying a lead screw 59 threaded in a transverse member 60 formed at the upper end of the lower segment 57.

The amount and direction of rotation of the motor 58, and thus of the threaded rod 59, may be controlled from the surface of the earth in any convenient manner. For example, one terminal of the motor 58 may be grounded to the electrode segment 57 and its other terminal may be connected by a conductor 65 in the supporting cable 67 to a reversible source of electrical energy 68 located at the surface of the earth.

The lower elongated electrode 14' comprises an upper segment 51 secured to the hollow cylindrical insulating member 50, a weighted lower segment 55 and a plurality of intermediate segments 52, 53 and 54 which are adapted to be collapsed and extended in substantially the same manner as the electrode 14a of Fig. 1. The principal current emitting electrode 12 is wrapped about the insulating member, as shown.

In order to change the length of the lower elongated electrode 14' in correspondence with the change in length of the upper elongated electrode 13', means is provided for coupling at least a part of the elongated electrode 14' to the lead screw 59. Such coupling means may comprise, for example, a pair of wires 61 and 62 having their lower ends secured at the top of the electrode segment 53 and having their upper ends secured to the lead screw 59. The wires 61 and 62 pass through pulleys or eyelets 63 and 64, respectively, as shown, so that as the upper electrode segment 56 is moved towards and away from the principal electrode 12 corresponding movements are imparted to the electrode segments 53, 54 and 55. Hence, after adjustment the lengths of the elongated electrodes 13' and 14' are substantially the same.

In operation of the embodiment shown in Fig. 4, the electrode array may be lowered through the bore hole and a log obtained with an electrical logging system of the type shown in Fig. 1, for example. This will give an electrical log of the desired section of the bore hole at one lateral depth of investigation. Without removing the electrode array from the bore hole, the operator may then apply current from the source 68 to the motor 58 to change the length of the electrodes 13' and 14' to the desired value. Thus, in Fig. 4A, the motor 58 has been operated for a sufficient length of time to reduce the lengths of the electrodes 13' and 14' a desired amount. The motor 58 is then deenergized and the second log is obtained as the electrode array is again moved through the bore hole. Since the length of the elongated electrodes 13' and 14' has been changed, the second log represents the electrical resistivity of the formation at a different lateral depth of investigation.

Figure 4B:
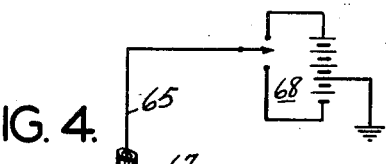
Figs. 4A and 4B illustrate the extended and collapsed positions, respectively, of the electrode apparatus of Fig. 4 in a bore hole.
Figure 4A:
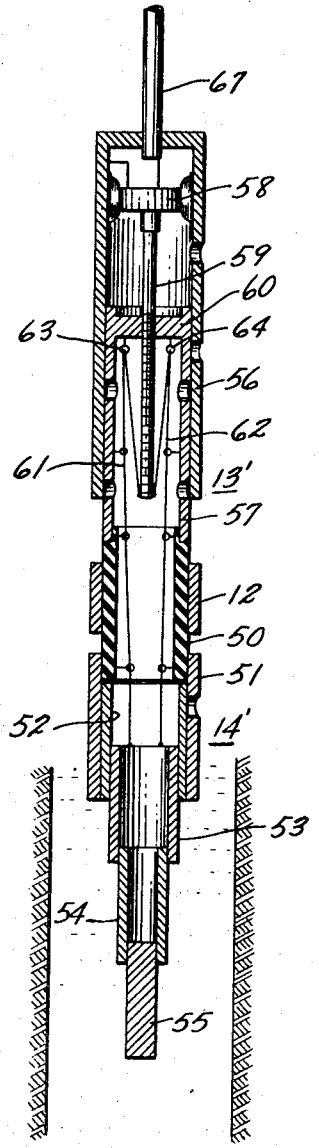

It will be apparent that the construction shown in Fig. 4 enables a log to be obtained substantially to the bottom of the bore hole, since the lower electrode 14' will collapse in a manner similar to the corresponding electrode in Fig. 2A. This is shown in Fig. 4B in which the segments 55, 54, 53 and 52 are telescoped into the segment 51, the wires 61 and 62 being slackened by this operation.

The invention thus provides novel and highly effective electrical logging apparatus by means of which electrical logs can be obtained substantially to the bottom of a bore hole with an electrode array including elongated electrodes. Since there is no long column of conducting drilling fluid below the collapsed electrode, the electrical resistivity measuring constants of the electrode array are not appreciably affected. Further, by providing mechanism of the type shown in Fig. 4, provision may be made for adjustment of the length of the elongated electrodes as required to enable logs to be obtained corresponding to different lateral depths of investigation without the necessity for bringing the apparatus out of the well.

If desired, suitable means may be provided for giving a continuous and direct indication of the actual length of the lower elongated electrode. This might be accomplished in Fig. 4, for example, by disposing within the insulating member 50 a conventional potentiometer which is normally spring biased to zero and connecting the movable contact thereof to the lowermost electrode segment 55 so that the output from the potentiometer will be a function of the position of the electrode segment 55 with respect to the electrode segment 51. The output from the potentiometer might be conducted to an indicating instrument at the surface of the earth so as to enable the operator to determine the condition of the electrode 14'.

Also, positive means might be provided for collapsing and extending the electrodes 14a in Fig. 2 and 14' in Fig. 4. This might be done, for example, by a yieldable means such as a simple spring retained within the interior of the hollow cylindrical segments 25 and 26 of the electrode 14a in Fig. 2, in lieu of or in conjunction with the weighted segment 27. Another means might be that of providing in the electrode array a motor driven pump controllable from the surface of the earth for pumping the bore hole liquid 11 to the interior of the electrode segments to move the same to their fully extended positions and for exhausting the liquid into the bore hole to collapse the electrode. In such case, the holes 34 and in electrode segments 25 and 26 would be eliminated.

It will be understood that the several representative embodiments described above are susceptible of numerous modifications in form and detail within the spirit of the invention which is defined in the appended claims.

I claim:

1. In electrical logging apparatus and the like, an electrode array comprising a pair of elongated, longitudinally spaced apart electrode means, a relatively short electrode interposed between the electrode means of said pair in fixed relation to the adjacent ends of said electrode means and insulated therefrom, and means mounting said short electrode and said electrode means for movement through the bore hole in said fixed relation, at least the lower one of said electrode means being collapsible and extensible relatively to the end thereof adjacent said short electrode.

2. In electrical logging apparatus and the like, an electrode array comprising a pair of elongated, longitudinally spaced apart electrode means, a relatively short electrode interposed between the electrode means of said pair in fixed relation to the adjacent ends of said electrode means and insulated therefrom, and means mounting said short electrode and said electrode means for movement through the bore hole in said fixed relation, both of said electrode means being collapsible and extensible relatively to the ends thereof adjacent said short electrode.

3. In electrical logging apparatus and the like, an electrode array comprising a pair of elongated, longitudinally spaced apart electrode means, a relatively short electrode interposed between the electrode means of said pair in fixed relation to the adjacent ends of said electrode means and insulated therefrom, and means mounting said short electrode and said electrode means for movement through the bore hole in said fixed relation, the lower of said electrode means being collapsible and extensible relatively to the end thereof adjacent said short electrode in response to continuation of lowering and raising of said electrode means after said lower electrode engages the bottom of the well.

4. In electrical logging apparatus and the like, an electrode array comprising a pair of elongated, longitudinally spaced apart electrode means, a relatively short electrode interposed between the electrode means of said pair in fixed relation to the adjacent ends of said electrode means and insulated therefrom, and means mounting said short electrode and said electrode means for movement through the bore hole in said fixed relation, means for rendering both of said electrode means collapsible and extensible relatively to the ends thereof adjacent said short electrode and the lower of said electrode means being further collapsible and extensible relatively to the end thereof adjacent said short electrode in response to continuation of lowering and raising said electrode array after said lower electrode means engages the bottom of the well.

5. Apparatus as described in claim 1, wherein at least said lower one of said electrode means of said pair comprises an elongated element formed of a conductive link chain, means tending to prevent knotting of said chain, and auxiliary electrical connections between adjacent links in said chain.

6. Electrode means for use in electrical logging operations and the like, comprising a pair of longitudinally spaced apart, elongated electrodes adapted to be moved through a well, each of said electrodes comprising a plurality of segments mounted for telescoping movement relatively to one another, and means for adjusting the positions of the segments forming each of said electrodes relatively to the adjacent ends of said electrodes to control the length thereof.

7. Electrode means for use in electrical logging operations and the like, comprising a pair of longitudinally spaced apart, elongated electrodes adapted to be moved through a well, each of said electrodes comprising a plurality of tubular segments mounted for telescoping movement relatively to one another, and motive means for adjusting the positions of the segments forming each of said electrodes to control the length of said electodes, segments forming the lower electrode of said pair being capable of further telescoping movement in response to continuation of lowering of said electrodes after said lower electrode has reached the bottom of the bore hole.

8. Apparatus as described in claim 1, wherein at least said lower one of said electrode means of said pair comprises a plurality of tubular, electrically connected electrode segments mounted for telescoping movement relatively to one another.

9. Apparatus as described in claim 1, wherein said lower electrode means of said pair comprises a plurality of tubular, electrically connected electrode segments mounted for telescoping movement relatively to one another, stop means preventing separation of said electrode segments when extended, means for normally maintaining said electrode segments in the extended position and means for indicating when said lower electrode is fully telescoped.

10. Apparatus as described in claim 1, wherein at least said lower one of said electrode means of said pair comprises an elongated element formed of a plurality of electrically conductive chain links in conductive relation.

References Cited in the file of this patent

UNITED STATES PATENTS

| | | |
|---|---|---|
| 814,529 | Furbish | Mar. 6, 1906 |
| 1,415,251 | McLean | May 9, 1922 |
| 1,999,414 | King | Apr. 30, 1935 |
| 2,281,766 | Hawley | May 5, 1942 |
| 2,297,828 | Flatford | Oct. 6, 1942 |
| 2,346,728 | Carlson | Apr. 18, 1944 |
| 2,537,481 | Parsons | Jan. 9, 1951 |